US011872417B2

(12) United States Patent
Waterford

(10) Patent No.: US 11,872,417 B2
(45) Date of Patent: Jan. 16, 2024

(54) FACEMASKS AND METHODS TO PROTECT AGAINST AIRBORNE PATHOGENS AND PARTICULATES

(71) Applicant: Trion Mask, LLC, Pembroke Pines, FL (US)

(72) Inventor: Steve Waterford, Boca Raton, FL (US)

(73) Assignee: Trion Mask, LLC, Boca Raton, FL (US)

( * ) Notice: Subject to any disclaimer, the term of this patent is extended or adjusted under 35 U.S.C. 154(b) by 0 days.

(21) Appl. No.: 17/683,431

(22) Filed: Mar. 1, 2022

(65) Prior Publication Data

US 2022/0273971 A1 Sep. 1, 2022

Related U.S. Application Data

(60) Provisional application No. 63/155,293, filed on Mar. 1, 2021.

(51) Int. Cl.
*A62B 23/02* (2006.01)
*A41D 13/11* (2006.01)

(52) U.S. Cl.
CPC ........ *A62B 23/025* (2013.01); *A41D 13/1138* (2013.01)

(58) Field of Classification Search
CPC ...... A62B 23/00–025; A62B 18/00–10; A62B 7/00; A62B 7/10; A62B 9/00; A62B 9/04; A41D 13/11–1138
See application file for complete search history.

(56) References Cited

U.S. PATENT DOCUMENTS

| | | | | |
|---|---|---|---|---|
| 5,724,964 A * | 3/1998 | Brunson | A41D 13/1115 128/206.25 |
| 2001/0015205 A1* | 8/2001 | Bostock | A41D 13/1161 128/206.19 |
| 2003/0154984 A1* | 8/2003 | Fernandes | A62B 18/084 128/206.13 |

(Continued)

FOREIGN PATENT DOCUMENTS

CN 212233239 U 12/2020

*Primary Examiner* — Rachel T Sippel
*Assistant Examiner* — Jacqueline M Pinderski
(74) *Attorney, Agent, or Firm* — Assouline & Berlowe, PA; Peter A. Koziol, Esq.

(57) ABSTRACT

A facemask assembly and method of manufacturing the same includes a thermo-polymer strap along the nose and upper cheek areas that can be custom conformed by the wearer to create an effective seal in both those areas of the face plus can be flared inward/outward to enhance the seal below the chin. In some embodiments a snap-together, two-part framework is employed to increase the breathable filter surface area and bring such near the mouth and nose. In some embodiments, the facemask has a front clip component that enables inserting elastic tubing/strap adjustably below the nose or looped back and then also inserted below the mouth to create ear loops. In addition, the external front clip—pressing between the filter and the interior back frame—allows for the vertical adjustment of the strap/tubing to customize/optimize the facial seal.
In addition, the front clip can be externally disconnected and internally inserted to create a strap holding method or a strap clip can be inserted to also hold within the facemask the straps that would otherwise be loose.

12 Claims, 13 Drawing Sheets

(56) References Cited

U.S. PATENT DOCUMENTS

| | | | | |
|---|---|---|---|---|
| 2010/0224199 | A1* | 9/2010 | Smith | A61M 16/06 128/863 |
| 2011/0180078 | A1* | 7/2011 | McKinley | A62B 23/025 128/863 |
| 2012/0042878 | A1* | 2/2012 | Woo | A62B 7/10 128/206.15 |
| 2012/0125341 | A1* | 5/2012 | Gebrewold | A41D 13/1146 264/249 |
| 2015/0034098 | A1* | 2/2015 | Schumacher | A41D 13/1138 128/863 |
| 2016/0001101 | A1 | 1/2016 | Sabolis | |
| 2018/0353782 | A1* | 12/2018 | Vasiliev | A62B 23/025 |
| 2020/0109847 | A1* | 4/2020 | Poggio | A61B 90/30 |
| 2021/0316170 | A1* | 10/2021 | Domoy | A62B 23/025 |

* cited by examiner

FACEMASKS AND METHODS TO PROTECT AGAINST AIRBORNE PATHOGENS AND PARTICULATES

CROSS-REFERENCE TO RELATED APPLICATIONS

This patent application claims the benefit under 35 U.S.C. § 119(e) of U.S. Provisional Patent Application No. 63/155,293, Facemasks and Methods to Protect Against Airborne Pathogens and Particulates filed on Mar. 1, 2021, which application is incorporated herein by reference.

FIELD OF THE INVENTION

The present invention relates to facemasks and methods, in particular a facemask and method that is designed to protect the wearer from airborne pathogens and particulates which includes a wearer-adjusted polymer strap to conform to both the nose and the entire upper cheek area. In some embodiments the facemask has a snap-together framework that expands the breathable surface of the filter material, facilitates assembly and cleaning, and enables a strap system that can be a single, adjustable continuous strap that goes above, or below, the ear or can be configured to create dual ear loops. Such an embodiment also enables the user to center the inward pressure against the face.

In addition, a clip is insertable to capture and hold the strap within the facemask structure or the snap-together structure is separatable and the front clip and strap inserted within the facemask.

BACKGROUND OF THE INVENTION

Facemasks are typically worn to cover the mouth and nose of the wearer for respiratory protection in environments with airborne particulates of air pollution, pathogens or allergens and have become especially significant due to the Covid-19 pandemic.

Since the American Civil War (1861~1865) surgical facemasks (also called “medical masks”) have been in widespread use to supposedly prevent, or reduce, infection of surgical wounds from staff-generated nasal and oral bacteria.

Thus, such medical masks were designed to be merely “cough suppressors” and not to provide protection to the wearer. However, according to the National Institute for Occupational Safety and Health (NIOSH), three clinical studies found no difference in surgical infection rates whether the staff wore medical masks or not. NIOSH also published that to be effective in reducing a wearer’s exposure to airborne substances, a respiratory protection device needs to have sufficient fit as well as high filtration efficiency. NIOSH also stated that a recent laboratory study of five most-common surgical masks found that 80-100% of subjects failed an OSHA-accepted qualitative fit test. (See CDC—NIOSH Science Blog—N95 Respirators and Surgical Masks at http://blogs.cdc.gov/niosh-scienceblog/2009/10/n95/).

A more recent study found that “surgical masks barely worked. Masks with ties filtered about 70% of small particles. Those with ear loops filtered less than 40%.”

Also “[what is] true for surgical masks appears to be doubly true for homemade cloth masks, which generally filter even fewer small particles and are even less effective. The overall evidence is clear: Standard cloth and surgical masks offer next to no protection against virus-sized particles or small aerosols” according to a recent Journal of American Medical Association (JAMA) study. (See at https://jamanetwork.com/article.aspx?doi=10.1001/jamainternmed.2020.4221)

Filtering Facepiece Respirators (FFP), with a NIOSH rating of N95-100, are more commonly used in environments where greater protection is required than that provided by medical masks and are designed to have edges to form a seal around the user’s nose and mouth. This tight facial fit is the one primary difference between respirators and medical masks which are not intended to provide respirator protection to the wearer.

Yet, these designs suffer from the inherent flaws:

(1) the nasal seal to be created by the wearer pinching in the usually aluminum strip in the hard nose bridge area rarely effects a proper seal but restricts the use of protective eye wear and most eyeglasses; and (2) ties or elastic strap connections that connect along the sides of the facemask are near parallel to the upper nose seal area and thus, when sufficiently tied or tensioned to seal against the face, simultaneously pull the facemask away from the upper nose seal area, preventing a complete seal; and (3) little or no upward lift is provided by either ties or elastic straps for a proper seal in the chin area.

Accordingly, a facemask that secures snuggly and comfortably to the wearer’s face with an adjustable and conformable elastic facial seal design, and with a highly user-adaptive elastic strap/tubing construct, would more effectively protect both the wearer and those in their proximity.

SUMMARY OF THE INVENTION

Shortcomings of conventional facemasks are overcome by a facemask comprising:

A user adjustable facial seal involving flexing the top section, dual polymer strap with the filter material bonded in between. This polymer strap can consist of a composite material that combines an ultra-high strength thermoplastic fiber with a low temperature activated thermoplastic polymer matrix. This construct takes advantage of the characteristics of each of the individual components—the strength of the fiber and the low temperature formability of the matrix polymer.

A two-part, snap-together frame construct that greatly expands the breathable filter surface area, facilitates assembly and enables a strap mounting variability of single strap—above or below the ear—or a dual ear loop system.

In another embodiment, a facemask comprises:

(a) A facial seal provided by an interior band of closed cell foam.

(b) A lower nose/upper cheeks adjustable seal created by user-adjustable polymer strap preferably configurable to provide a compression zone over the wearer’s lower nose, rather than the upper, nose bridge area.

(c) The same to enable a customized chin seal.

(d) A continuous strap that is user positioned to center the inward sealing pressure appropriate to their face.

The entire facemask system that can be washed in warm, or hot, water with a soap/detergent, or spray disinfected, and then reused similar to cloth masks.

When the facemask is not worn the loose strap can be stored inside the facemask by being inserted within a clip snapped into the facemask interior frame or, by unclipping the Front Clip—which then contains the strap—and inserting that within the interior of the facemask.

DETAILED DESCRIPTION OF PREFERRED EMBODIMENT(S)

Figure 1:
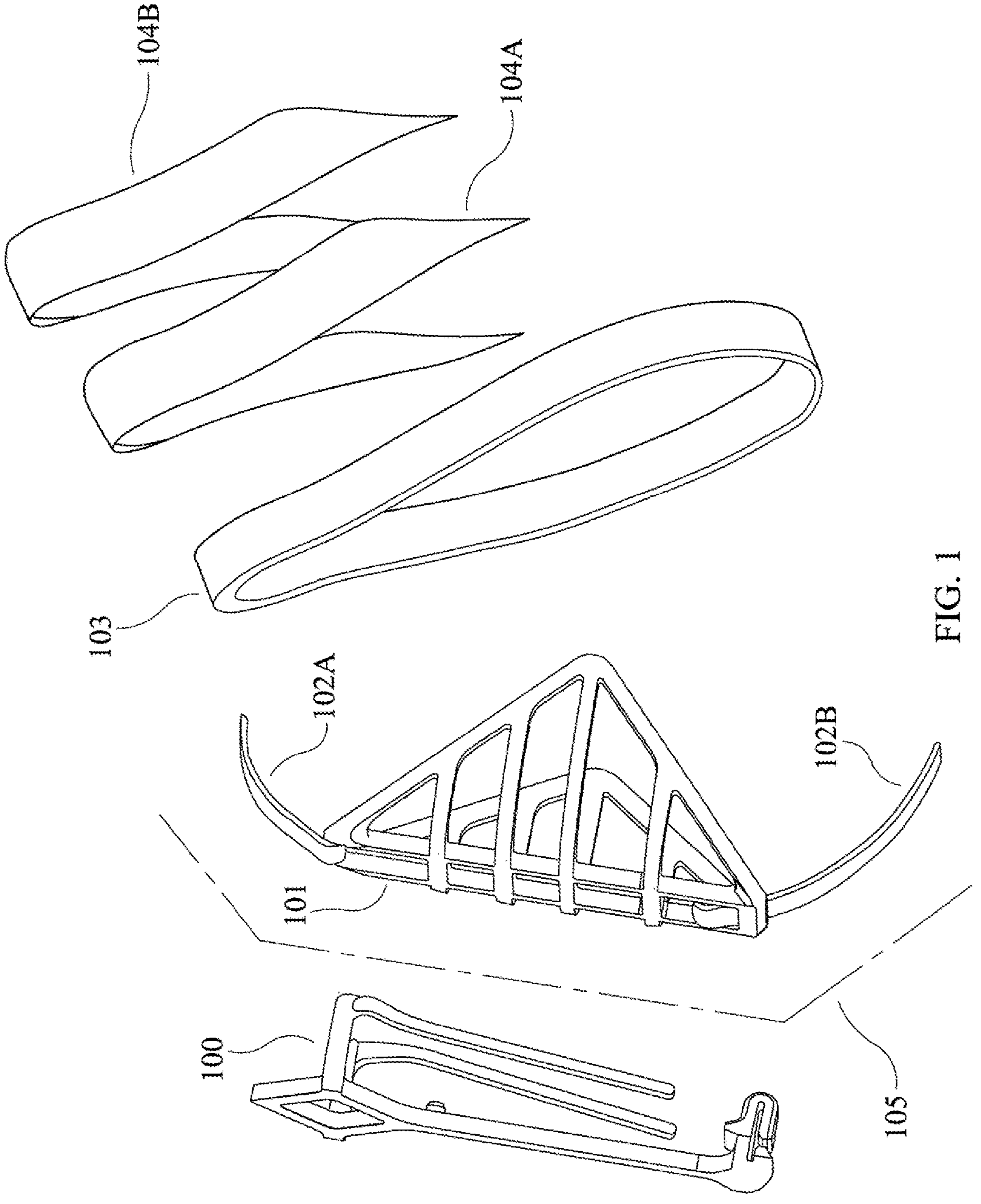
FIG. 1 is a perspective exploded view of the facemask showing all of the facemask components minus the filter material and the mounting strap system.

When describing elements of FIGS. 1-13, the same number is used to identify elements that are the same or substantially similar to each other in the different views illustrated in FIGS. 1-13.

Hereinafter the reference to the “strap” is meant to represent a wide varies of straps, cords, tubing, and/or O-rings. For purposes of the drawing depictions a hollow silicone tubing is shown.

Not shown is the means of tensioning and securing such straps via, for example, mounting buckles, tri-glides, plastic strap adjusters, cord-locks and other adjustable elements and an open-ended strap can also simply be tied behind the ears or the head. Straps, tubings, tensioning and other similar, equivalent and/or functional securing materials known in the art and to be discovered may used as securing material to secure the facemasks to a donning user.

As shown in FIG. 1 is a perspective exploded view of the facemask components minus the filter material 105 and the mounting strap 106. The sequence of assembly is that the multi-layer Filter is pre-cut to a template, or laser cut, and inserted between the conformal straps 104A and 104B at the top whereinafter heat is applied to bond all three elements together. The Filter is then heat sealed at the edges and inwardly folded and heat sealed again to create an interior “wing” wherein the Back Frame 101 is inserted and the conformal strap top 102A and conformal strap bottom 102B—having already been heat bonded to the Back Frame 101 at their respective positions—are then heat bonded to both the conformal internal bottom strap 104A and Filter 105 (not shown) at the base. Thereafter the facial sealing Foam Strip 103—with a strong, temperature-tolerant adhesive on one side—is inserted around the interior rim to complete the facemask A1 assembly.

Figure 2:
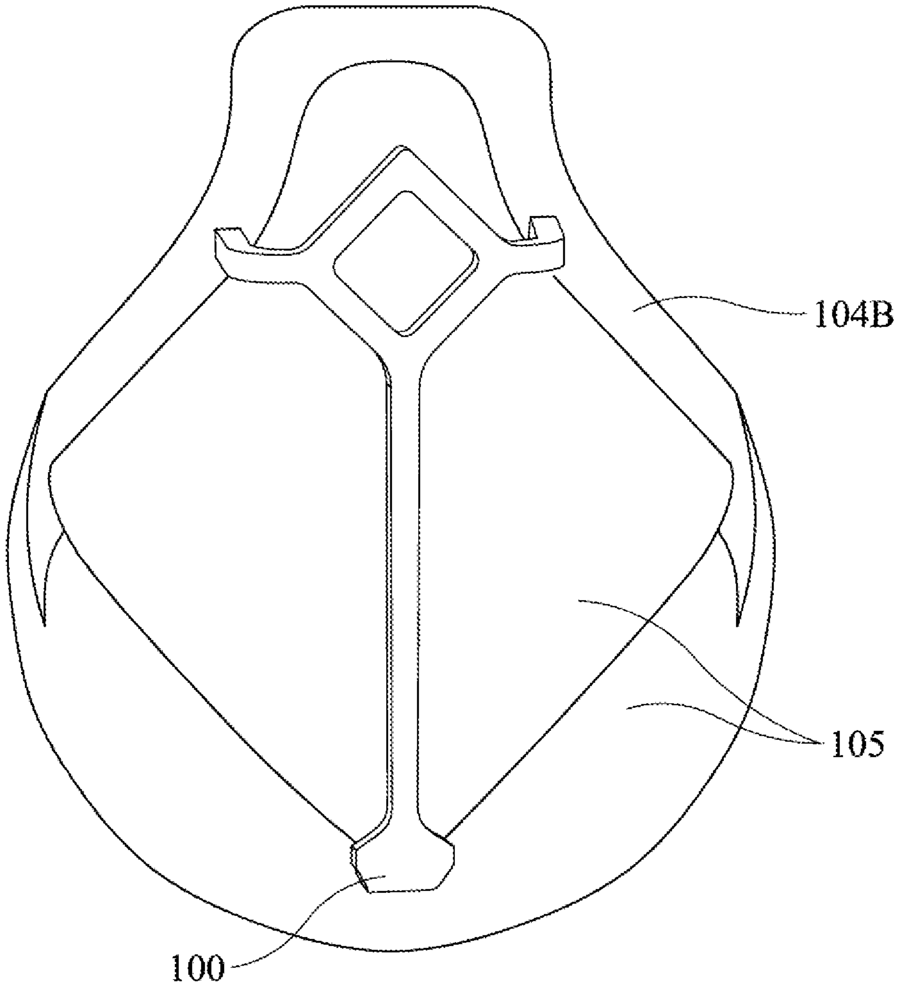
FIG. 2 is a perspective view taken from the front side of an embodiment of the facemask with the filter material shown.

As shown in FIG. 2 a front view of the assembled Facemask 1A components of FIG. 1 with conformable nose and upper cheek polymer straps 104A/B configured to provide a compression zone over the nose of the wearer and against the upper cheek area. The Front Clip 100 is shown in its snapped in position over the internal Back Frame 101 (not shown), atop the Filter 105.

Figure 3:
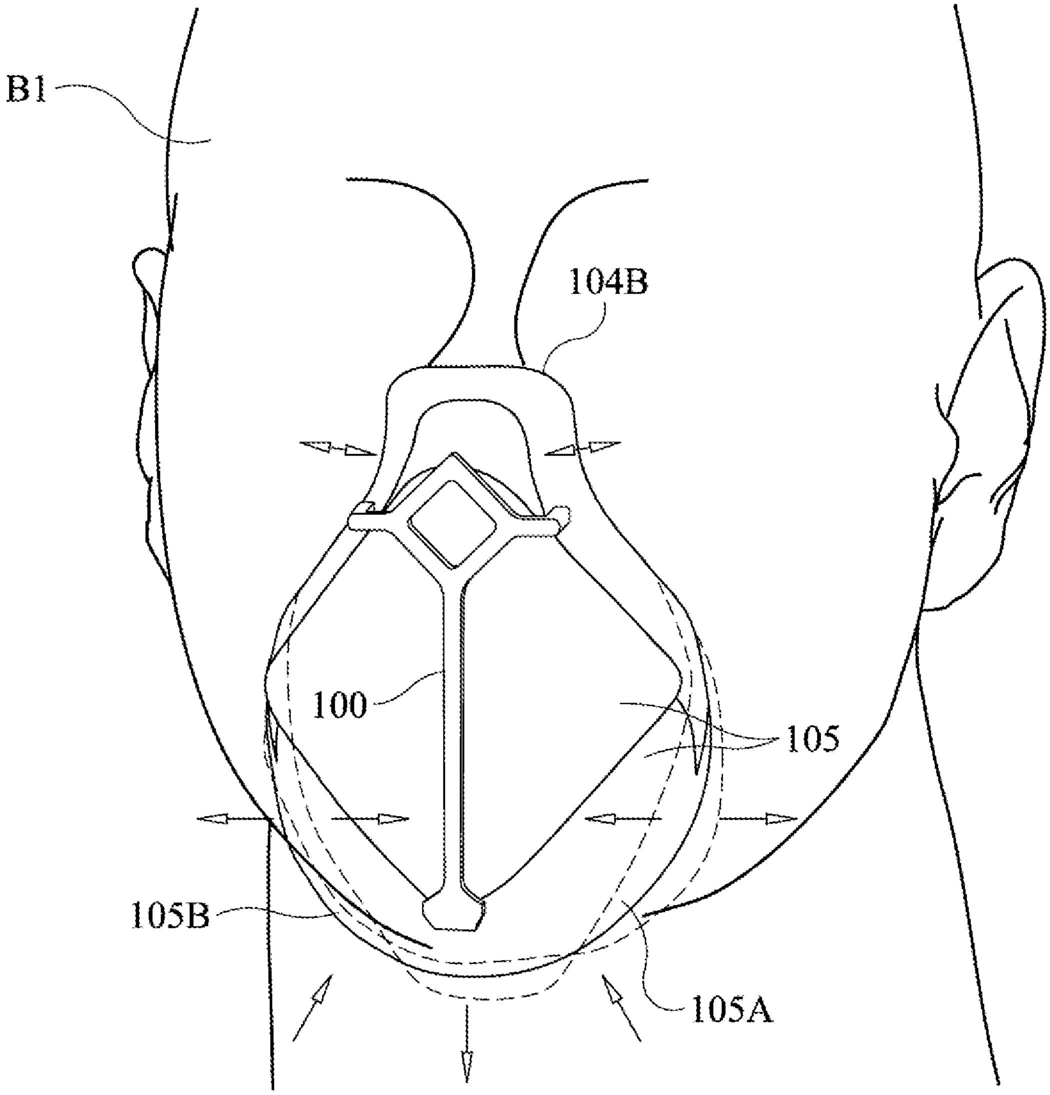
FIG. 3 is a perspective view of the facemask illustrated in FIG. 1 on a head form showing the nose and chin area seal adjustments via flexing the polymer strap.

FIG. 3 is a perspective view of the Facemask A1 of FIG. 2 mounted on to a Head Form B1, minus the strap system, showing both the soft tissue area nasal seal being adjusted via the inward/outward flexing the conformal strap 102A and 102B as well as similarly adjusting the seal in the chin area. The dot-dash-dot line 105A represents an inward adjustment of the conformal strap 102A and 102B to elongate the chin seal for larger faces. The dashed line 105B represents an outward adjustment of the same to provide a tighter chin seal for a smaller face. An advantage of facial seal being precisely adjustable to suit the facial physiology of the wearer is an increased likelihood that the facemask A1 is more comfortable and effective than conventional facemask assemblies.

Figure 4:
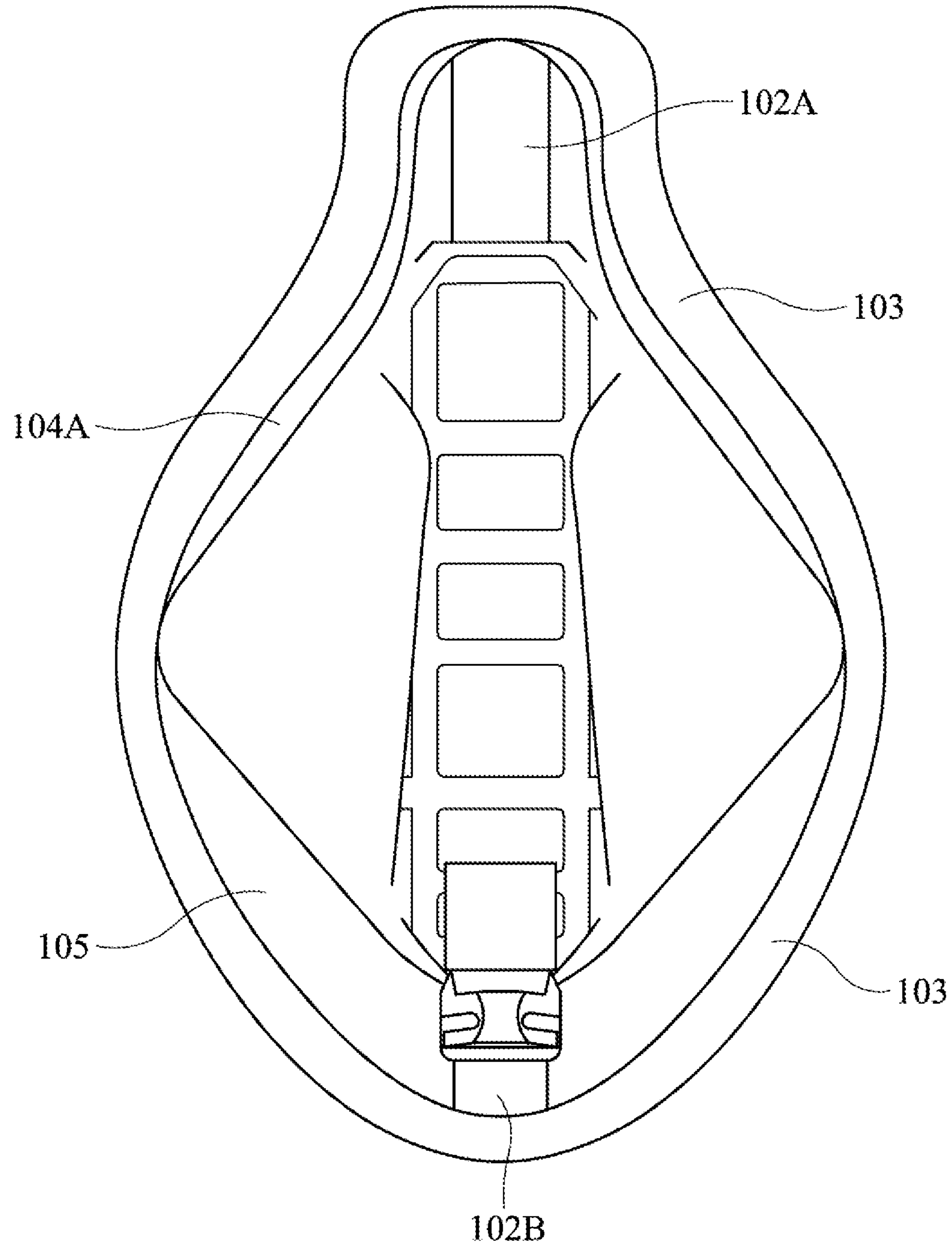
FIG. 4 is a perspective view of the facemask illustrated in FIGS. 2-3 taken from the back side of the facemask assembled from components illustrated in FIG. 1.

As shown in FIG. 4 is a back view of Facemask 1A of FIGS. 2 & 3 further comprising an interior foam strip facial seal 103. A preferred embodiment would have this rim consist of a closed cell foam that is designated as “Ultra Soft” (i.e: 25% compression with only 3~4 psi pressure).

Figure 5A:
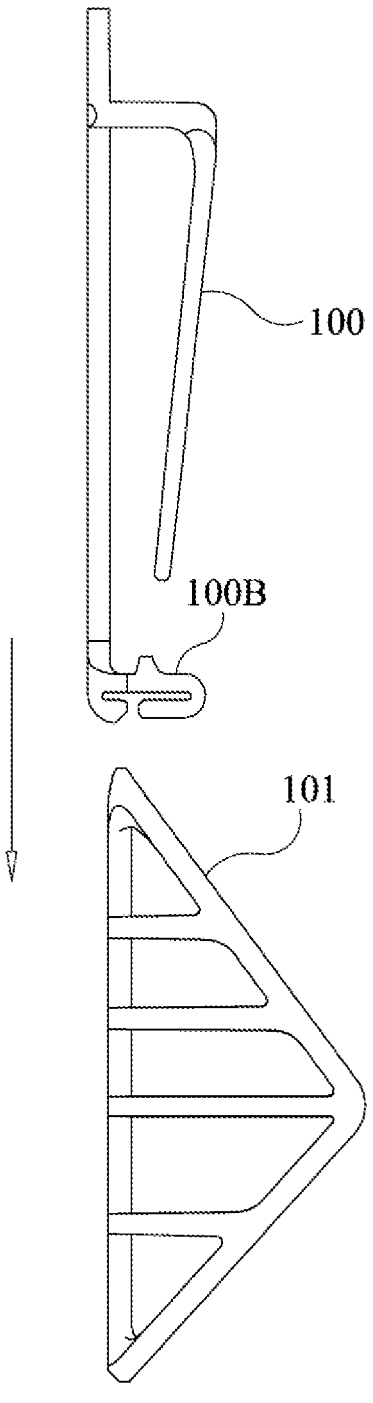
FIG. 5A is a side view of the Front Clip and Back Frame shown in FIG. 1 in a separated alignment.
Figure 5B:
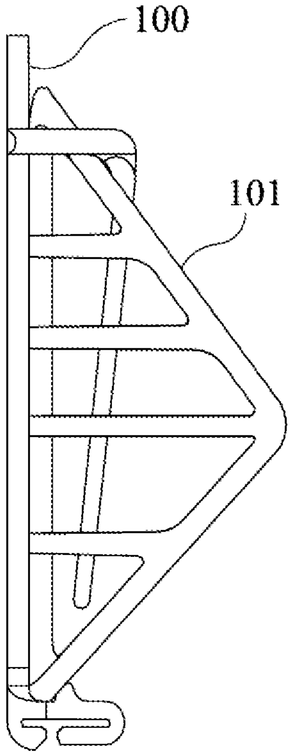
FIG. 5B is a side view of the same but now snapped together.
Figure 5C:
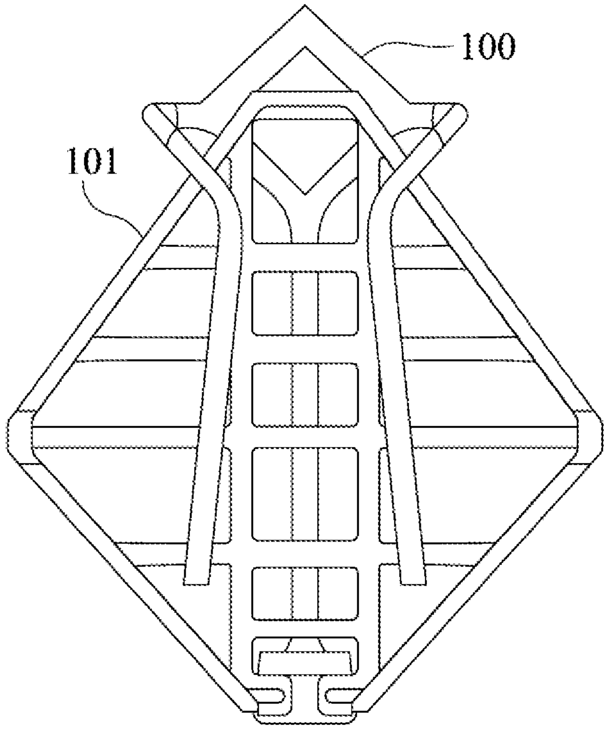
FIG. 5C is a back view of the same.

FIG. 5A is an exploded side view of internal Back Frame 101 and external Front Clip 100 without Filter 105 between. FIG. 5B is the side view but with the two elements snapped together. FIG. 5C is a back view of the same. The snap-in construct not only supports ease of assembly and spreads the filter material internally but also facilitates disassembly to improve the ability to more completely clean and reuse.

Figure 6B:
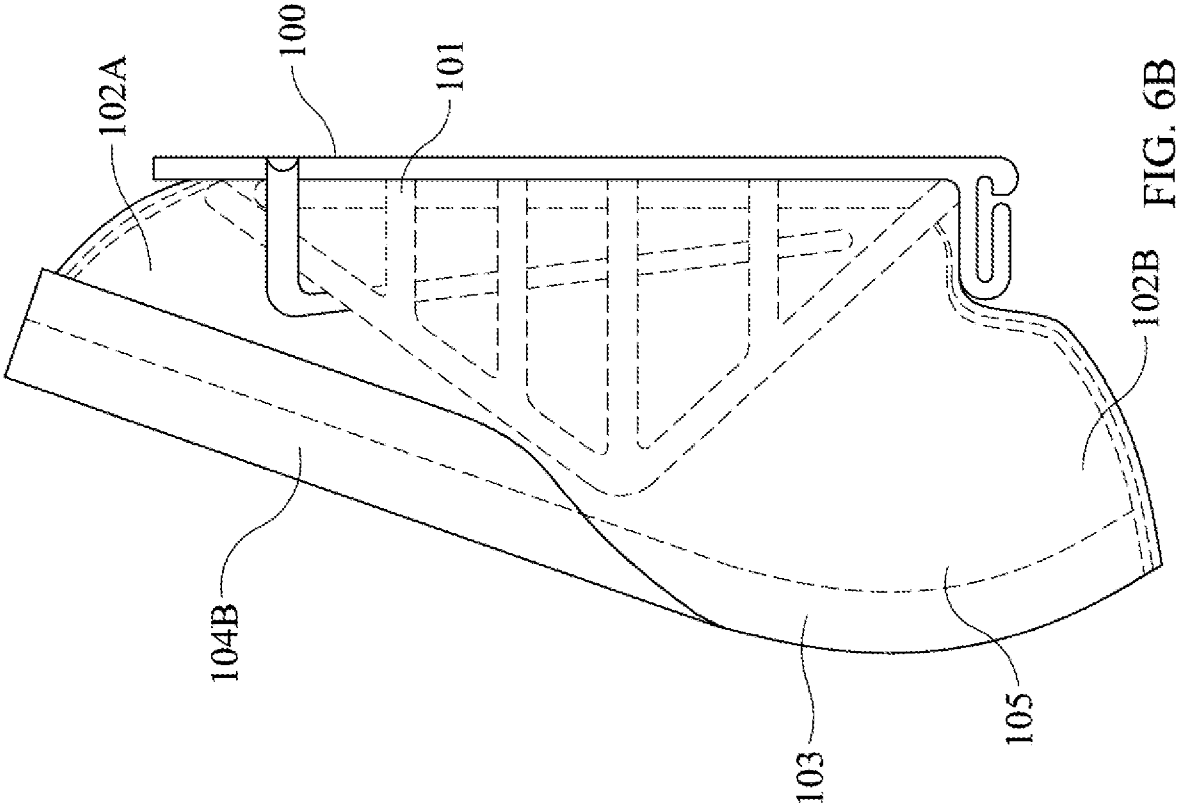
FIG. 6B is a perspective side view of the same.
Figure 6A:
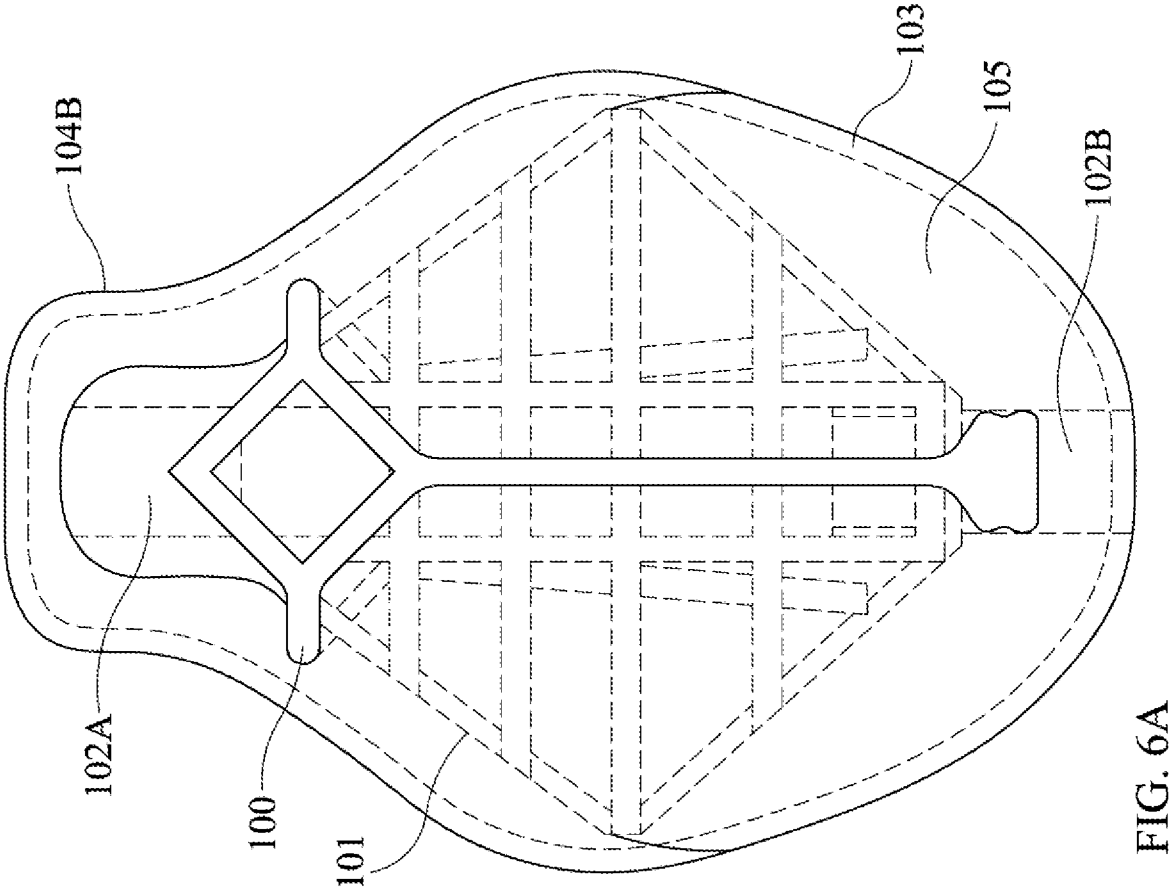
FIG. 6A is a perspective front view of the Front Clip snapped over the Back Frame with the Filter in between and out the sides to form the facial seal area.

FIG. 6 shows Frames 100&101 covered with Filter material 105. FIG. 6A is a perspective front view of the Front Clip snapped over the Back Frame with the Filter in between and out the sides to form the facial seal area with the internal Facial Seal Foam Strip 103 (shown as dashed lines). FIG. 6B is a perspective side view of the same.

Figure 7:
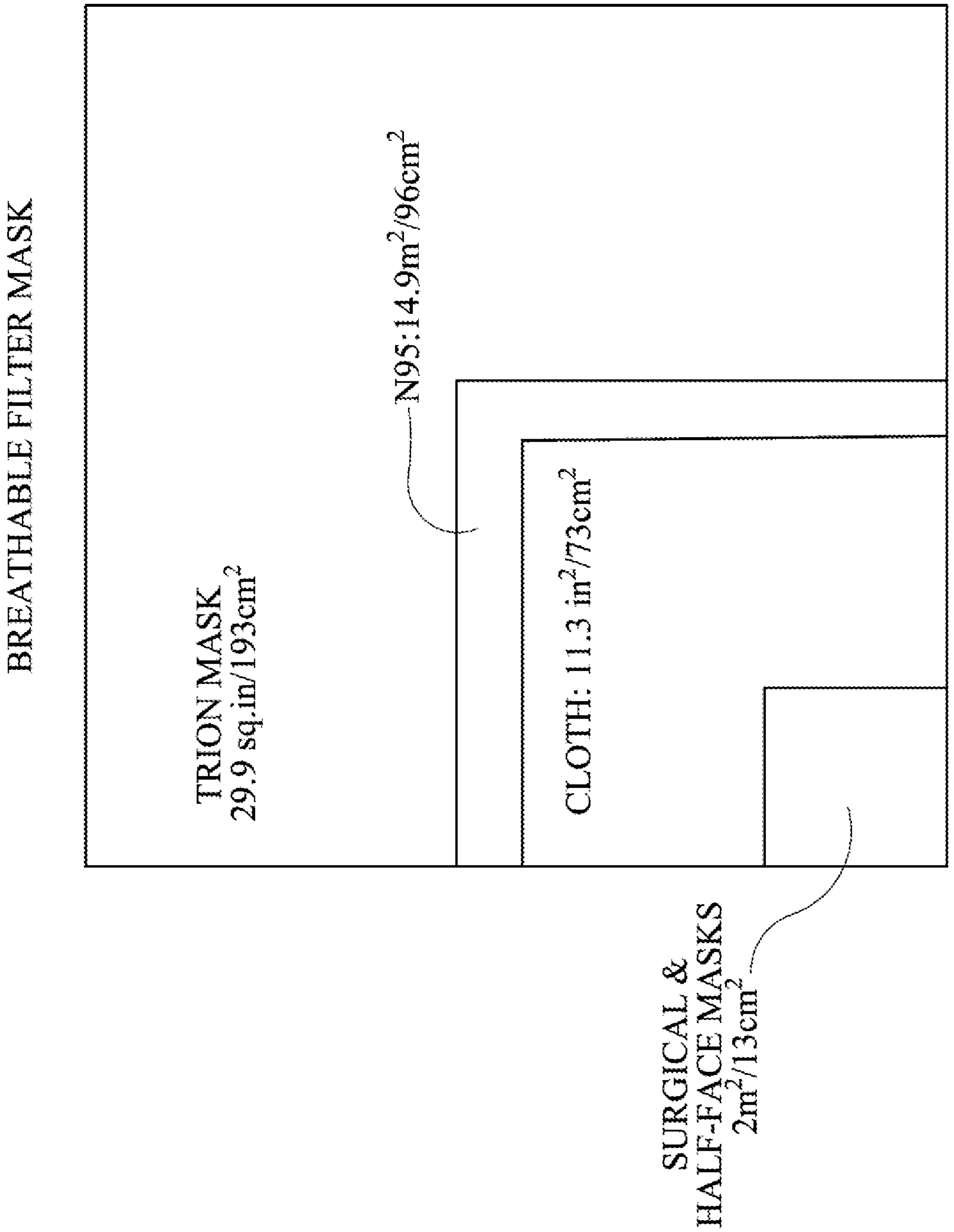
FIG. 7 is a graphic showing the difference in breathable area between an embodiment of an invention described herein and competitor products.

FIG. 7 is a graphic display of the comparative benefit of the present facemask assembly A1 with the greater breathable filter area created by the structure of the Front Clip 100 and the Back Frame 101 with the Filter 105 sandwiched in between. This significant increase in breathable area facilitates alternatively incorporating a wide variety of filter materials with different filtration levels (with possible biocidal elements) and the amount of possible layers not possible due to the comparatively limited breathable areas of competitor masks.

It is a benefit of the present invention that it currently incorporates a three-layer filter with the outermost layer being hydrophobic—to reject the droplet form of transmission of the Covid-19 and/or Influenza and similar viruses—the internal layer is rated to an N95 level of particulate capture and the innermost layer is hydrophilic to not only help the capture of airborne particulates but also coughed-out—possibly infective—aerosol droplets.

Figure 8:
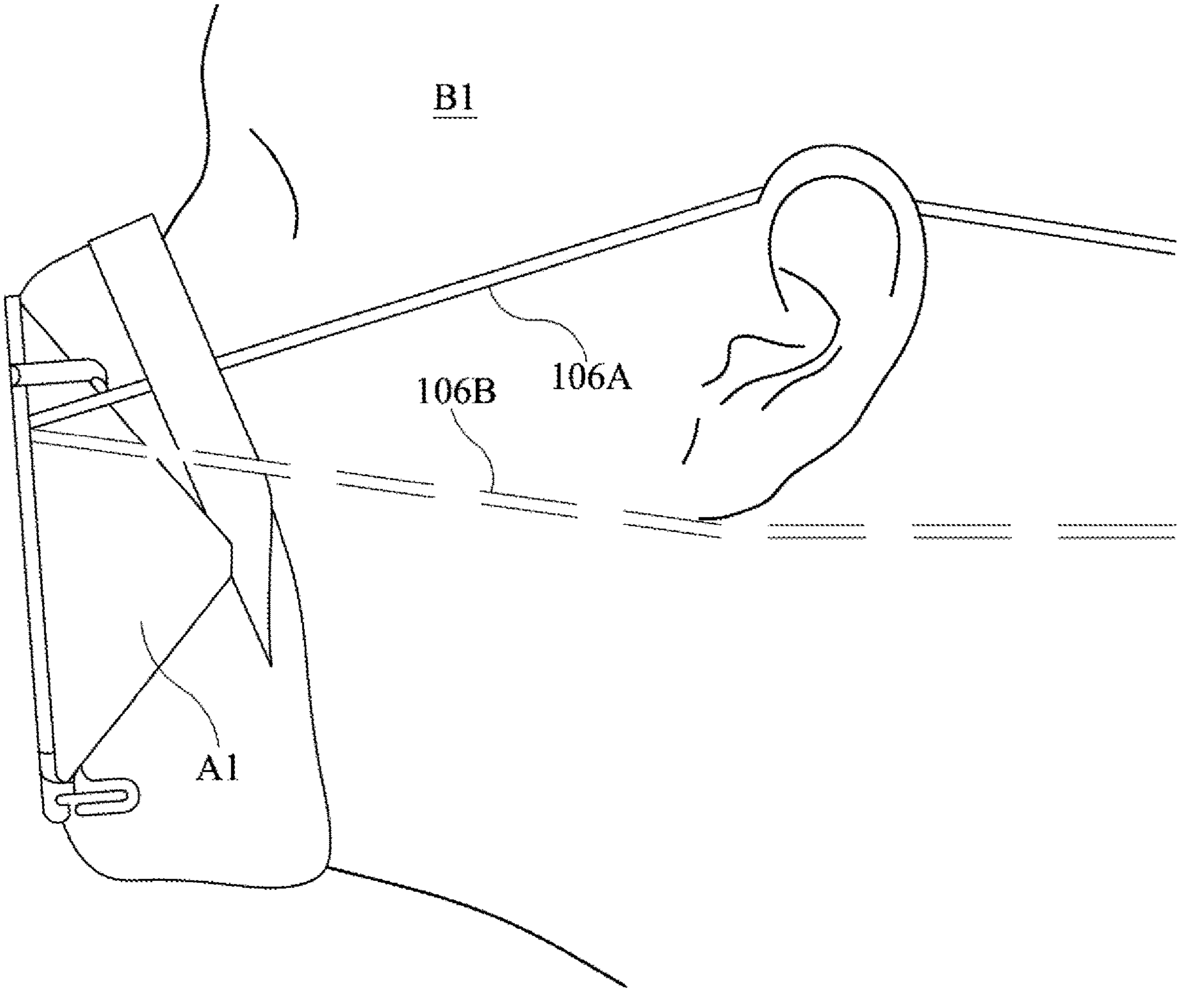
FIG. 8 is a side view of the facemask with the single strap tubing configuration running either above or below the ear.

FIG. 8 showing the Facemask A1 of FIGS. 2-4 with the single mounting strap 106 inserted behind the Front Clip 100 and then extended above 106A the ear of the head form B1 and below the ear 106B of the same. Once adjusted as described above, the Facemask assembly can be readily removed by the wearer, for example, by holding the face-mask and lifting forward and then over the head without the need for slacking the strap. Thereafter the wearer can don the facemask assembly again, without further adjustment.

Figure 9:
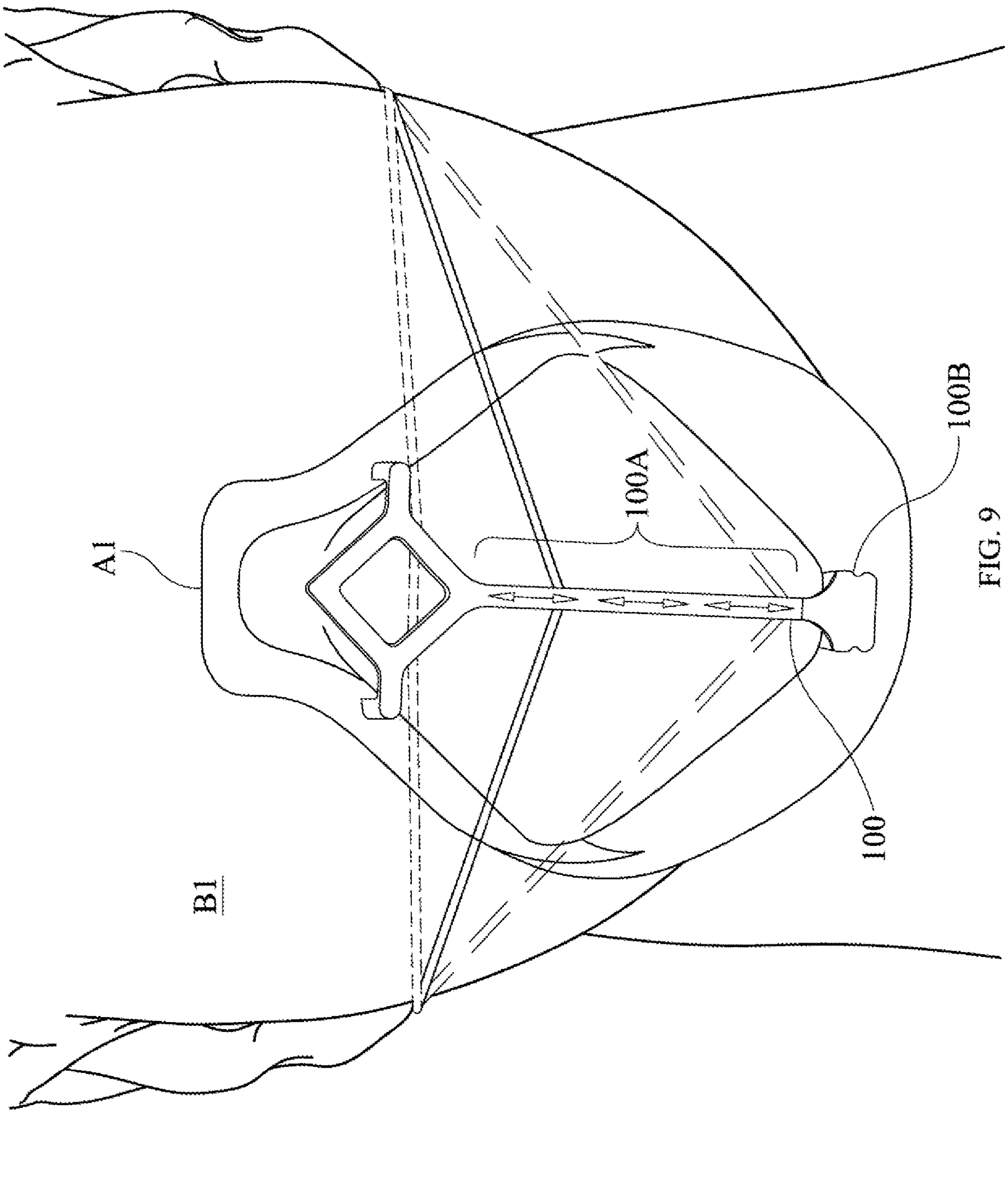
FIG. 9 is a perspective view showing how the Front Clip allows for the vertical adjustment of the strap.

FIG. 9 is a perspective view of the single polymer strap being adjusted vertically to optimize the compression force specific to the wearer. While shown as the tubing strap mounted below the ear, a benefit of the present invention is that this adjustability applies whether the strap is above or below the ear. Front Clip 100 enables whatever strap/tubing to be inserted, removed and replaced between the Filter 105 and the Back Frame 101. The Front Clip 100 structure has a post 100A that enables the vertical adjustment of the single strap/tubing to center the inward pressure on the wearers' face as opposed to most masks providing fixed-in-place straps. Front Clip 100 has a slot construct at its base 100B to enable the ear loop system to be created but this entire system is also configured to enable the insertion of a wide variety of straps, cords, tubing, and/or o-ring stock to enable a wearer to make emergency repairs to Facemask A1. For example, if the existing strap were to break the user could utilize a wide variety of suitable materials such as his or her own shoelace for an immediate field repair. This feature could be life-saving should such an immediate field repair be necessary in an infectious or hazardous air environment.

Figure 10:
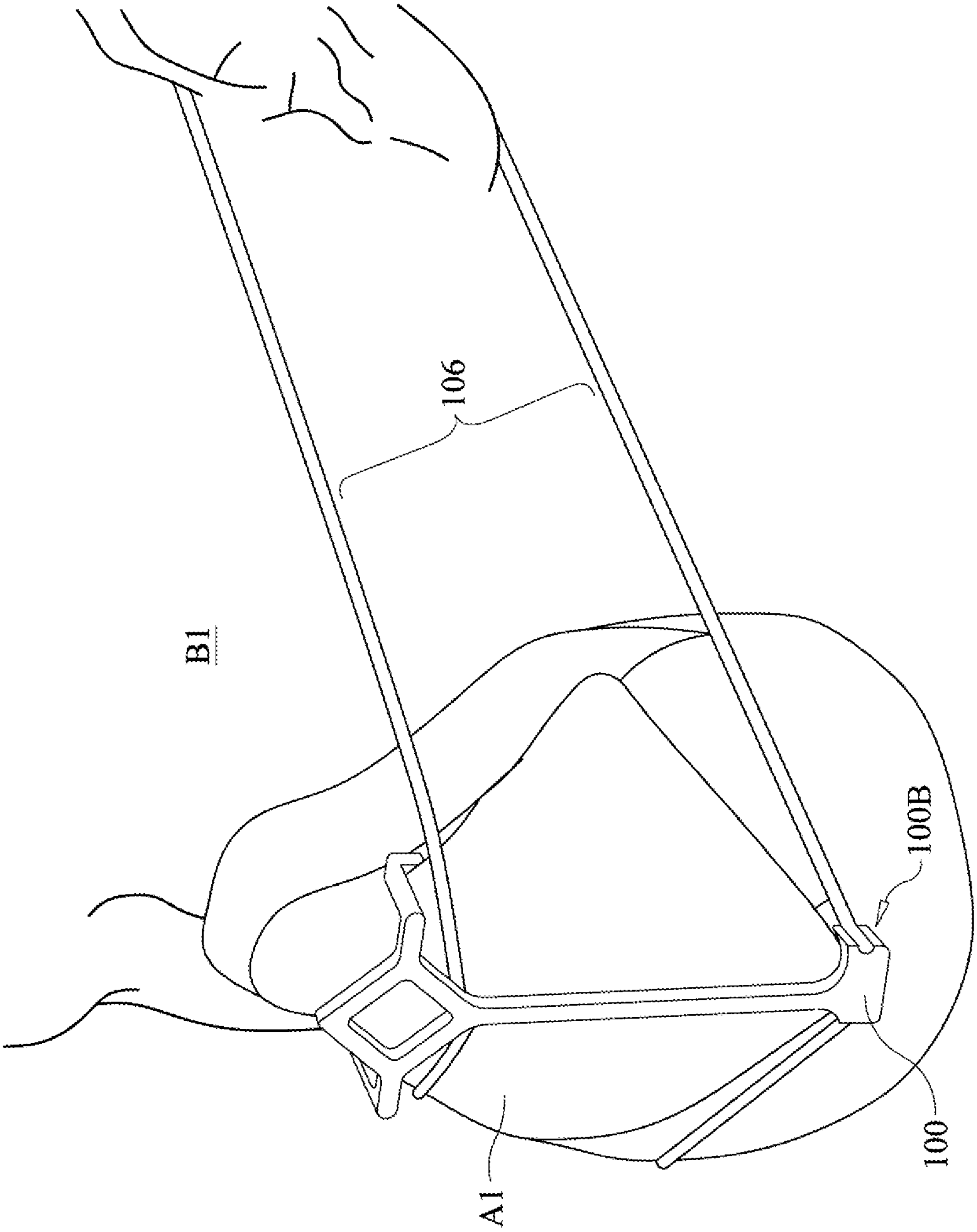
FIG. 10 is a perspective view of the same strap now configured as a dual ear loop approach mounted on the head form.

FIG. 10 is a perspective view of the Facemask A1 mounted on to the Head Form B1 using a dual head loop approach. In the higher position the Strap 106 is inserted between the Front Clip 100 and the Filter 105 sandwiched between the internal Back Frame 101. The lower position Strap 106 is then inserted within the groove 100B within the lowest portion of the Front Clip thus creating the dual loops of the Strap shown extending behind the left ear of the Head Form B1. In some embodiments, the strap/tubing can be slid back and forth to balance the position of any cord-locks, clips and/or buckles (not shown).

Figure 11B:
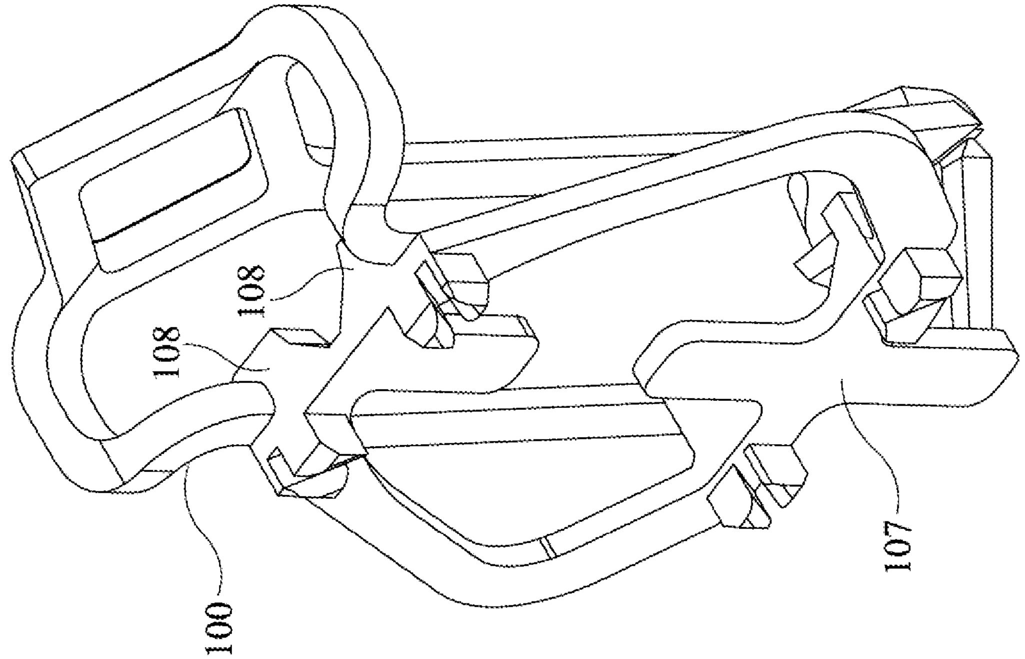
FIG. 11B is a perspective view of the Strap Clip inserted within the Front Clip.
Figure 11A:
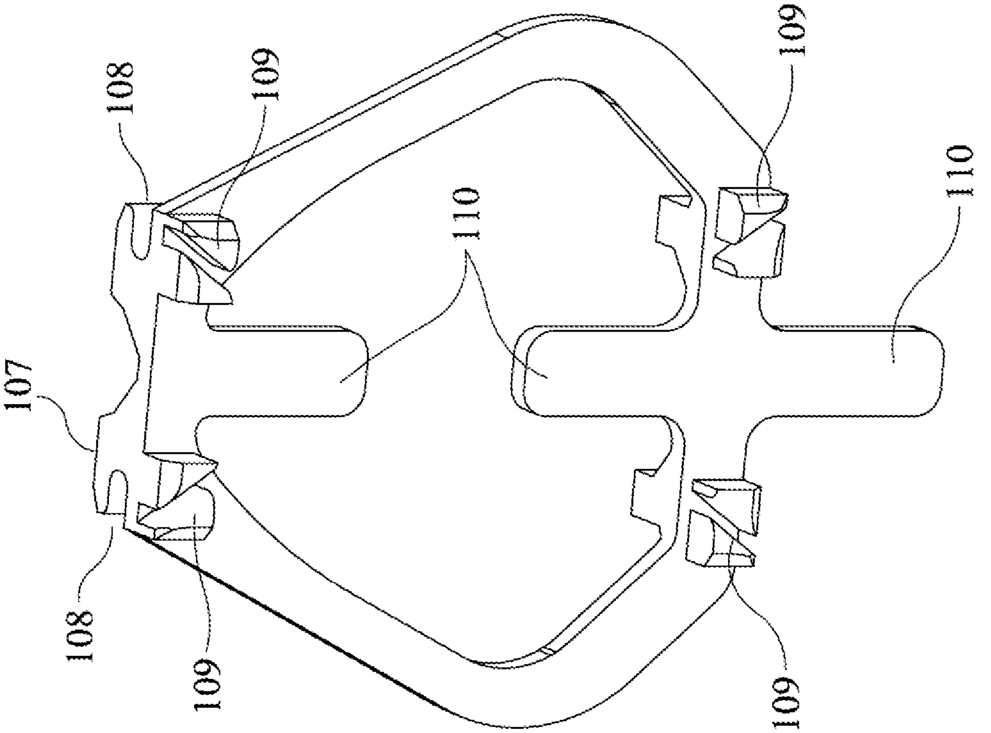
FIG. 11A is a perspective view of the Strap Clip.

FIG. 11A is a perspective view of the Strap Clip 107 showing the snap-in slots 108 for the Front Clip 100, the four compression slots 109 for the strap 106 (not shown) to be inserted and the Tabs 110 that the loose strap 106 is inserted behind and held therein. FIG. 11B is a perspective view of the Front Clip 100 inserted into the snap-in slots 108 of the Strap Clip 107.

Figure 12:
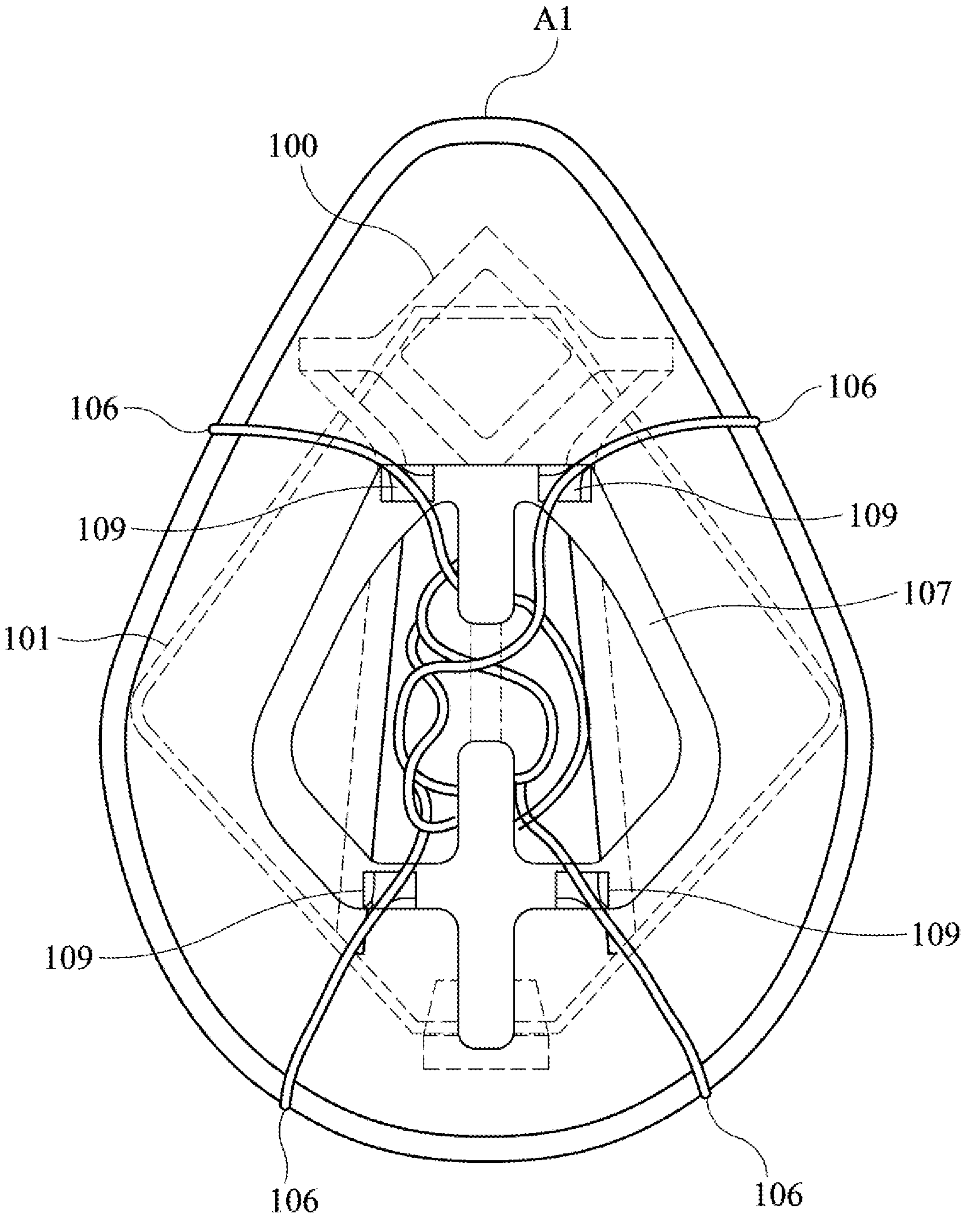
FIG. 12 is a front view of the Strap Clip inserted within the facemask.

FIG. 12 is a back view of the Facemask A1 with the Strap Clip 107 inserted and the Front Clip 100 snapped into the two snap-in slots (not shown). The strap 106 is shown inserted into the four compression slots 109 and pressed below the Tabs 110 into the body of the Facemask A1 and Back Frame 101.

Figure 13:
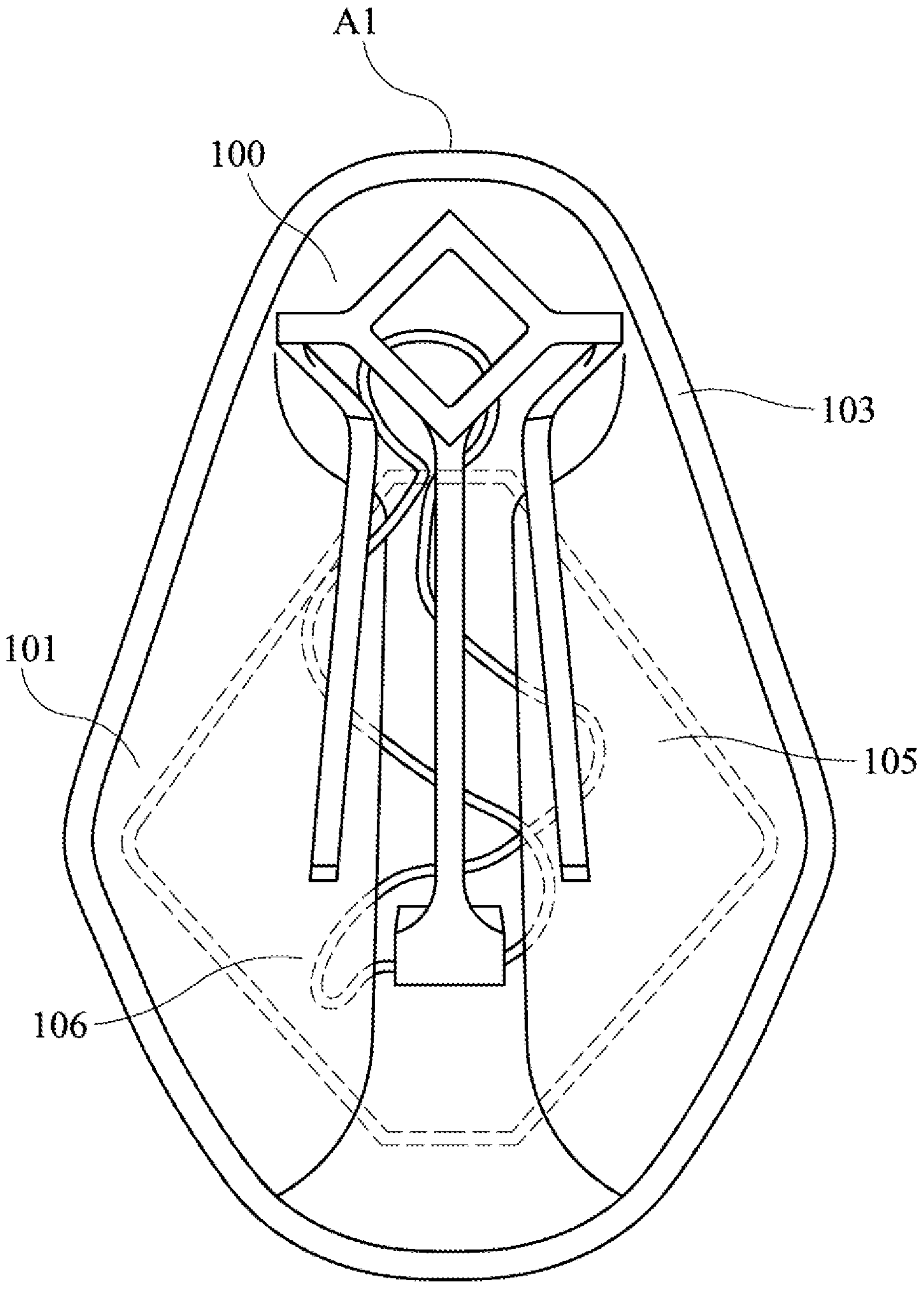
FIG. 13 is back view of the facemask with the Front Clip unclipped from the Back Frame and retaining the strap.

FIG. 13 is a back view of the Facemask A1 with the Front Clip 100—having been unclipped from the Back Frame 101 but retaining the strap 106—inserted within the back of the Facemask A1 in following the strap being pushed up to the Back Frame and somewhat inserted within the Filter 105 folds. The interior lip created by the foam strip 103 aids in holding the Front Clip 100 and strap 106.

It is a benefit of the present invention that the strap as illustrated in FIGS. 8~13 can be hollow medical-grade surgical tubing. Other suitable securing material can be used, for example O-ring cord or polymer flat strap.

It is a benefit of the present invention that it does not require a front vent—which is normally a hole in front of the mouth with an elastic diaphragm valve—and thus broadly distributes any exhalations to distribute their collective velocity. But furthermore, the preponderance of the filter material is directly in front of the mouth to facilitate the necessary increased airflow when required by the wearer due to exercise, for example, necessarily requiring mouth breathing.

It is also a benefit of the present invention that the Filter is in close proximity to the nose and mouth of the wearer, thereby providing less opportunity for back pressure, build-up of $CO_2$ within the facemask, and/or re-inhalation of exhaled air by the wearer.

The expanded breathable surface area in the nose zone allows the escape of exhaled heat and $CO_2$ loaded air which leads to improved nasal breathability. In addition, nasal breathing has been found to lower blood pressure and individuals' heartrates. It has also been found to help improve the function of individual's organs, including the brain, with optimal oxygenation.

As used herein "elastic" is intended to mean the state or quality of being elastic, flexible, resilient and/or adaptable.

While facemask assembly 1A as illustrated in FIGS. 8~10 has starting position on the left side of the assembly (when viewed from the back or from the perspective of the wearer), it will be understood that in other embodiments (such as for a left-handed wearer) the starting position can be on the right side of the assembly.

While particular elements, embodiments and applications of the present invention have been shown and described, it will be understood, that the invention is not limited thereto since modifications can be made by those skilled in the art without departing from the scope of the present disclosure, particularly in light of the foregoing teachings.

Furthermore, particular elements of the present invention as described in the embodiments above can be incorporated into facemask assemblies in other suitable combinations or arrangements, for example, to suit particular applications.

The examples used herein are only some embodiments of the invention. Thus, it is seen that the objects of the present invention are efficiently obtained, although modifications and changes to the invention should be readily apparent to those having ordinary skill in the art, which modifications are intended to be within the spirit and scope of the invention as claimed. It is also understood that the foregoing description is illustrative of the present invention and should not be considered as limiting. Therefore, other embodiments of the present invention are possible without departing from the spirit and scope of the present invention.

What is claimed is:

1. A facemask comprising:

a framework comprising a front clip and a back frame wherein:

the front clip is adapted distal with respect to a donning user and the back frame; and, the back frame is adapted proximal with respect to the donning user and the front clip;

a filter material is inwardly folded over at least a distal portion and a proximal portion of the back frame wherein a breathable filter surface area is created proximal to the donning user from the front clip and the breathable filter surface area includes an area of the inwardly folded section the filter material; and, the breathable filter surface area is adapted to surround a nose, one or more cheeks and a mouth of the donning user and the breathable filter surface further extends to where the breathable filter surface area is adapted to seal at the nose, the cheeks and below the mouth.

2. The facemask of claim 1 wherein the framework is a two-part framework consisting of the front clip and the back frame wherein the front clip and the back frame are separated at least in part by the filter material.

3. The facemask of claim 1 further comprising a user-conformable rim adapted to form a seal over the nose; and, the user-conformable rim is adapted to flare inward or outward at an upper cheek section to adjust the seal at the upper cheek section and flare inward or outward to the seal below, or against, a chin.

4. The facemask of claim 1 further comprising the front clip adapted for insertion and extraction of at least one or more securing materials comprising elastic straps; o-rings, and tubing; and the one or more securing materials are configured as at least one of:

a single strap adapted to be worn above an ear;

a single strap adapted to be worn below an ear; and, a strap inserted into a lower slot wherein the strap forms a loop mount adapted to be worn around an ear.

5. The facemask of claim 1 where a topmost securing material is mounted proximal to the front clip adapted to be centered at one or more of the nose and the mouth; and, the facemask is adapted for pressure centering by sliding the topmost securing material between the filter material and the front clip, wherein the topmost securing material is adapted to cross over the facemask.

6. The facemask of claim 1 further comprising the front clip component and a securing material that are adapted to be unclipped from an interior of the back frame of the two-part framework enabling the securing material to be inserted, and held, within the interior of the back frame.

7. The facemask of claim 1 further comprising a strap clip that is within an interior of the snap-together framework and a securing material is held within the strap clip.

8. The facemask of claim 1 further comprising a user-conformable rim comprised of foam.

9. The facemask of claim 1 further comprising a user-conformable rim comprised of closed-cell foam.

10. The facemask of claim 1 further comprising the front clip with a post, wherein the post is adapted to be centered at one or more of the nose and the mouth, for vertical adjustment of a securing material in relation to the donning user.

11. The facemask of claim 9 wherein the closed-cell foam comprises Ultra Soft material.

12. A method for protection against airborne pathogens and particulates comprising:

using a facemask comprising:

a framework comprising a front clip and a back frame wherein:

the front clip is adapted distal with respect to a donning user and the back frame; and, the back frame is adapted proximal with respect to the donning user and the front clip;

a filter material is inwardly folded over at least a distal portion and a proximal portion of the back frame wherein a breathable filter surface area is created proximal to the donning user from the front clip and the breathable filter surface area includes an area of the inwardly folded section the filter material; and, the breathable filter surface area is adapted to surround a nose, one or more cheeks and a mouth of the donning user and the breathable filter surface further extends to where the breathable filter surface area is adapted to seal at the nose, the cheeks and below the mouth.

* * * * *